US011631256B2

(12) United States Patent
Hori (10) Patent No.: US 11,631,256 B2
(45) Date of Patent: Apr. 18, 2023

(54) TRAVEL PATH RECOGNITION APPARATUS AND TRAVEL PATH RECOGNITION METHOD

(71) Applicant: Mitsubishi Electric Corporation, Tokyo (JP)

(72) Inventor: Yasuyoshi Hori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 715 days.

(21) Appl. No.: 16/467,575

(22) PCT Filed: Jan. 10, 2017

(86) PCT No.: PCT/JP2017/000404
§ 371 (c)(1),
(2) Date: Jun. 7, 2019

(87) PCT Pub. No.: WO2018/131061
PCT Pub. Date: Jul. 19, 2018

(65) Prior Publication Data
US 2021/0342603 A1 Nov. 4, 2021

(51) Int. Cl.
*G06V 20/56* (2022.01)
*B60W 40/072* (2012.01)
(Continued)

(52) U.S. Cl.
CPC .......... *G06V 20/588* (2022.01); *B60W 30/12* (2013.01); *B60W 40/06* (2013.01);
(Continued)

(58) Field of Classification Search
USPC ........................................................ 701/23
See application file for complete search history.

(56) References Cited

U.S. PATENT DOCUMENTS

2008/0027627 A1  1/2008  Ikeda et al.
2008/0109118 A1* 5/2008  Schwartz ............. G06V 20/588
                                                    701/1
(Continued)

FOREIGN PATENT DOCUMENTS

EP    1 752 947 A1    2/2007
JP    07-311896 A    11/1995
(Continued)

OTHER PUBLICATIONS

Office Action dated Dec. 13, 2021 in Chinese Application No. 201780081899.6.
(Continued)

*Primary Examiner* — Maceeh Anwari
(74) *Attorney, Agent, or Firm* — Sughrue Mion, PLLC; Richard C. Turner (57) ABSTRACT

An object is to provide technology capable of appropriately estimating lane marking information. A travel path recognition apparatus includes a travel path recognizer. When a plurality of pieces of the lane marking information equal to or greater than a predetermined number are acquired, the travel path recognizer corrects the plurality of pieces of the lane marking information into a plurality of pieces of current-position lane marking information based on the vehicle behavior. Then, the travel path recognizer estimates one piece of current-position lane marking information as estimation lane marking information based on the plurality of pieces of current-position lane marking information to use the estimation lane marking information to recognize a travel path.

5 Claims, 7 Drawing Sheets

(51) Int. Cl.
*G06V 10/44* (2022.01)
*B60W 30/12* (2020.01)
*B60W 40/06* (2012.01)

(52) U.S. Cl.
CPC ........... *B60W 40/072* (2013.01); *G06V 10/44* (2022.01); *B60W 2520/10* (2013.01); *B60W 2520/14* (2013.01); *B60W 2552/53* (2020.02); *B60W 2720/24* (2013.01)

(56) References Cited

U.S. PATENT DOCUMENTS

| | | | | |
|---|---|---|---|---|
| 2009/0167864 | A1* | 7/2009 | Unoura | G06T 7/12 348/148 |
| 2013/0028473 | A1* | 1/2013 | Hilldore | G06V 20/56 382/103 |
| 2013/0253753 | A1* | 9/2013 | Burnette | G06V 20/588 382/104 |
| 2017/0015317 | A1* | 1/2017 | Fasola | G01C 21/165 |
| 2017/0261327 | A1* | 9/2017 | Olsson | G01C 21/30 |
| 2018/0174459 | A1* | 6/2018 | Oh | B60W 30/10 |
| 2019/0027040 | A1* | 1/2019 | Ogawa | G06K 9/6292 |

FOREIGN PATENT DOCUMENTS

| | | |
|---|---|---|
| JP | 2003-067755 A | 3/2003 |
| JP | 2012-058984 A | 3/2012 |
| JP | 2015-217863 A | 12/2015 |
| JP | 2016-190530 A | 11/2016 |
| WO | 2007/077682 A1 | 7/2007 |

OTHER PUBLICATIONS

Communication dated Jun. 22, 2021, issued by the European Patent Office in application No. 17 891 504.7.
Communication dated May 25, 2021 by The State Intellectual Property Office of People's Republic of China in application No. 201780081899.6.
Japanese Notice of Reasons for Refusal issued in JP 2017-541411 dated Nov. 21, 2017.
Japanese Decision of Refusal issued in JP 2017-541411 dated Apr. 19, 2018.
International Search Report of PCT/JP2017/000404 dated Apr. 18, 2017.
Office Action dated Apr. 24, 2022 from the China National Intellectual Property Administration in Chinese Application No. 201780081899.6.
Communication dated Aug. 2, 2022 from the Chinese Patent Office in Chinese Application No. 201780081899.6.
Office Action dated Dec. 22, 2022 issued by the European Patent Office in European Application No. 17 891 504.7.

* cited by examiner

TRAVEL PATH RECOGNITION APPARATUS AND TRAVEL PATH RECOGNITION METHOD

CROSS REFERENCE TO RELATED APPLICATIONS

This application is a National Stage of International Application No. PCT/JP2017/000404 filed Jan. 10, 2017.

TECHNICAL FIELD

The present invention relates to a travel path recognition apparatus and a travel path recognition method that recognize a travel path on which a vehicle travels.

BACKGROUND ART

A Vehicle including a lane keep assist function uses a travel path recognition apparatus that recognizes a travel path on which the vehicle travels. For example, a travel path recognition apparatus disclosed in Patent Document 1 estimates a traffic lane border based on a sequence of points of traffic-lane candidate points corresponding to a detected traffic lane border, and sets a prediction parameter coefficient after traveling for a set time period based on a sequence of points before traveling for a set time period with respect to calculation time of the current case. Then, the travel path recognition apparatus estimates a traffic lane after traveling for the set time period based on this prediction parameter coefficient. Specifically, according to the travel path recognition apparatus disclosed in Patent Document 1, a prediction parameter coefficient after traveling for a set time period is set based on a sequence of points of previous traffic-lane candidate points, and a traffic lane is estimated based on this prediction parameter coefficient.

PRIOR ART DOCUMENT

Patent Document

Patent Document 1: Japanese Patent Application Laid-Open No. 2012-058984

SUMMARY

Problem to be Solved by the Invention

However, in the technology described in Patent Document 1 above, a value storing the sequence of points of the traffic-lane candidate points corresponding to a detected traffic lane border is used as it is without consideration of vehicle behavior to set the prediction parameter coefficient. As a result, there is a problem in that prediction accuracy is relatively low because a traffic lane border corresponding to a vehicle position at a time point of capturing an image is used as it is without consideration of a change amount of vehicle behavior.

In addition, there is a problem of being liable to be subjected to influence of unevenness of a detection value due to disturbance or the like because a previously detected and stored value is used as it is.

Accordingly, the present invention has been achieved in view of the problems as described above, and has an object to provide technology capable of appropriately estimating lane marking information.

Means to Solve the Problem

According to the present invention, a travel path recognition apparatus includes a lane marking acquisition unit configured to acquire lane marking information concerning a position and a shape of a lane marking in front of a vehicle with respect to a position of the vehicle, a vehicle behavior acquisition unit configured to acquire vehicle behavior concerning a vehicle speed and a yaw rate of the vehicle from acquisition time of the lane marking information to current time, and a travel path recognizer configured to recognize a travel path on which the vehicle travels based on the lane marking information. When the lane marking acquisition unit acquires a plurality of pieces of the lane marking information equal to or greater than a predetermined number, the travel path recognizer corrects the plurality of pieces of the lane marking information into a plurality of pieces of current-position lane marking information based on the vehicle behavior, and estimates one piece of current-position lane marking information as estimation lane marking information based on the plurality of pieces of current-position lane marking information to use the estimation lane marking information to recognize the travel path. The plurality of pieces of current-position lane marking information concern the position and the shape of the lane marking with respect to a current position of the vehicle.

Effects of the Invention

According to the present invention, when a plurality of pieces of the lane marking information equal to or greater than a predetermined number are acquired, the travel path recognizer corrects the plurality of pieces of the lane marking information into a plurality of pieces of current-position lane marking information based on the vehicle behavior, and estimates one piece of current-position lane marking information as estimation lane marking information based on the plurality of pieces of current-position lane marking information to use the estimation lane marking information to recognize the travel path. Consequently, the estimation lane marking information can be appropriately estimated.

These and other objects, features, aspects and advantages of the present invention will become more apparent from the following detailed description of the present invention when taken in conjunction with the accompanying drawings.

DESCRIPTION OF EMBODIMENTS

First Embodiment

Figure 1:
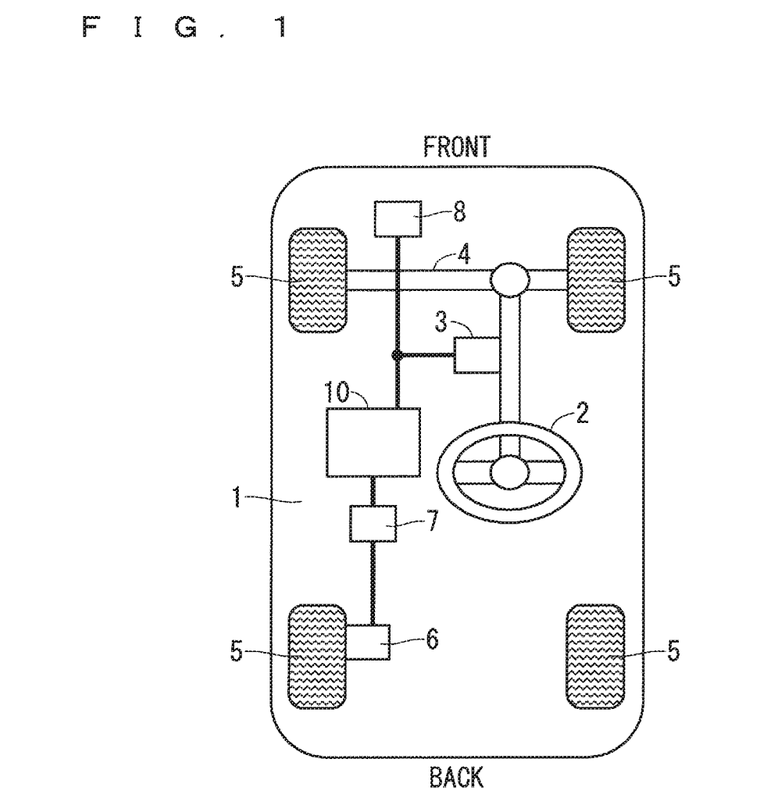
FIG. 1 is a diagram illustrating one example of a configuration of a drive assist device including a control unit.

A travel path recognition apparatus according to a first embodiment of the present invention is implemented by a control unit mounted to a vehicle. FIG. 1 is a configuration diagram illustrating one example of a configuration of a drive assist device including a control unit 10 according to the first embodiment. Note that, in each of the embodiments, the same or similar parts are denoted by the same reference symbols, and overlapping description will be omitted as appropriate.

A steering device 4 steers tires 5 based on behavior of a steering wheel 2 coupled to the steering device 4. A motor 3 is coupled to the steering device 4 similarly to a general electric power steering device. Torque generated by the motor 3 is applied to the steering device 4 as appropriate. The motor 3 is driven based on a target electric current output by the control unit 10.

A wheel speed sensor 6 detects vehicle speed information concerning a vehicle speed of a vehicle 1. As the vehicle speed information, for example, a vehicle speed of the vehicle 1, a traveling distance of the vehicle 1, acceleration of the vehicle 1, or the like is used. The traveling distance is differentiated with respect to time to obtain the vehicle speed. The acceleration is integrated with respect to time to obtain the vehicle speed.

A yaw rate sensor 7 detects yaw rate information concerning a yaw rate of the vehicle 1. As the yaw rate information, for example, a yaw rate of the vehicle 1, a yaw angle of the vehicle 1, a yaw moment of the vehicle 1, or the like is used. The yaw angle is differentiated with respect to time to obtain the yaw rate. The yaw moment is subjected to predetermined calculation to obtain the yaw rate.

A camera 8 is installed near a rear-view mirror inside the vehicle 1, and captures a front-view image of the vehicle 1 through a windshield of the vehicle 1. The front-view image captured by the camera 8 is used to detect lane marking information to be described later in detail.

The control unit 10 is directly or in directly connected to the motor 3, the wheel speed sensor 6, the yaw rate sensor 7, and the camera 8. A signal from each sensor and the front-view image from the camera 8 are input to the control unit 10. The control unit 10 determines a target electric current, which is a drive signal of the motor 3, based on these pieces of input information, and outputs the target electric current to the motor 3. Note that the control unit 10 may include a control function of a general electric power steering device.

Figure 2:
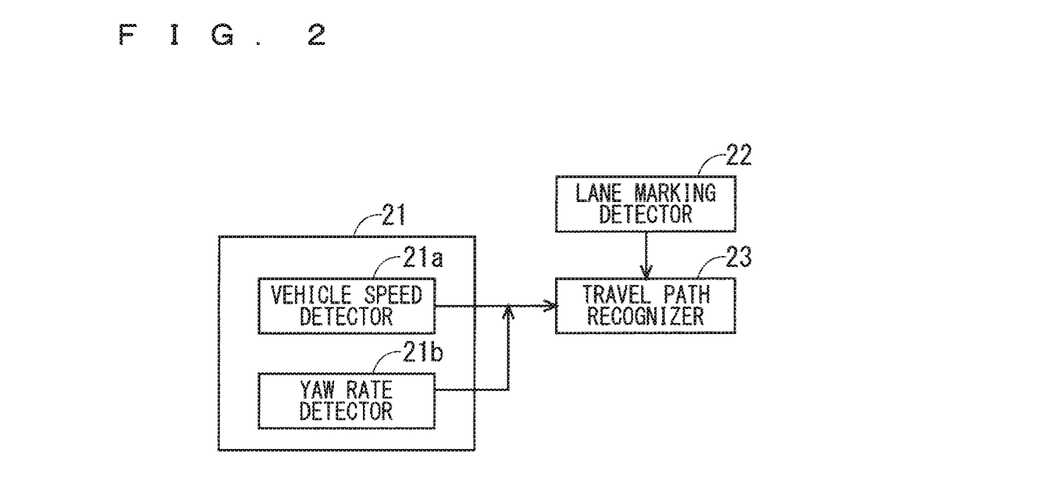
FIG. 2 is a block diagram illustrating a function of a travel path recognition apparatus according to a first embodiment.

FIG. 2 is a block diagram illustrating a function of the travel path recognition apparatus implemented by the control unit 10. A travel pass recognition apparatus of FIG. 2 includes a vehicle behavior detector 21, a lane marking detector 22 that detects lane marking information, and a travel path recognizer 23.

The vehicle behavior detector 21 serving as a vehicle behavior acquisition unit includes a vehicle speed detector 21*a* and a yaw rate detector 21*b*. The vehicle speed detector 21*a* detects a vehicle speed of the vehicle 1 on certain occasions from the time when the lane marking detector 22 detects lane marking information to the current time based on the vehicle speed information detected by the wheel speed sensor 6. The yaw rate detector 21*b* detects a yaw rate of the vehicle 1 on certain occasions from the time when the lane marking detector 22 detects lane marking information to the current time based on the yaw rate information detected by the yaw rate sensor 7.

The vehicle behavior detector 21 configured as described above detects vehicle behavior concerning the vehicle speed and the yaw rate of the vehicle 1 from the detection time of the lane marking information to the current time. The vehicle behavior detector 21 outputs the detected vehicle behavior to the travel path recognizer 23.

The lane marking detector 22 serving as a lane marking acquisition unit detects lane marking information based on data of the front-view image captured by the camera 8, and outputs the detected lane marking information to the travel path recognizer 23 on a 0.1-msec cycle, for example. The lane marking information is information concerning a position and a shape of the lane marking in front of the vehicle 1 with respect to a position of the vehicle 1 at the time of capturing the image. The lane marking information includes, for example, a vehicle-lane marking distance, a vehicle angle, curvature of the lane marking, and a curvature change rate of the lane marking. The vehicle-lane marking distance is a distance between the vehicle 1 and a portion of the lane marking on a side of the vehicle. The vehicle angle is inclination of a traveling direction of the vehicle 1 with respect to the portion of the lane marking.

Here, a detection method of the lane marking information will be described. From the front-view image captured by the camera 8, the lane marking detector 22 extracts lane markings, such as white lines, located on both the right and left sides of a road in the front-view image by using a known method. Then, the lane marking detector 22 calculates curvature and a curvature change rate of the obtained lane markings. The following description is based on an assumption that the calculated curvature change rate is constant within the captured area. In this case, based on the curvature at the image-capture (detection) position and the curvature change rate being constant within the captured area, the lane marking detector 22 calculates the above-mentioned curvature of a portion of the captured lane marking in front of the vehicle 1 with respect to the position of the vehicle 1 at the image-capture time point. Further, the lane marking detector 22 estimates a lane marking extended to the position of the vehicle 1 with an extrapolation method by using a known method. Then, as the above-mentioned vehicle-lane marking distance, the lane marking detector 22 calculates a distance from the position of the vehicle 1 at the image-capture time point to the estimated lane marking. Further, as the above-mentioned vehicle angle, the lane marking detector 22 calculates inclination of the traveling direction of the vehicle 1 at the image-capture time point with respect to the estimated lane marking.

The travel path recognizer 23 stores the lane marking information detected by the lane marking detector 22, and estimates estimation lane marking information based on the stored lane marking information. Then, based on the estimation lane marking information, the travel path recognizer 23 recognizes a travel path on which the vehicle travels, and outputs the estimation lane marking information to the outside.

Here, an estimation value of the estimation lane marking information is stabilized as more pieces of lane marking information are used to estimate the estimation lane marking information. However, at the same time, a storage area and a calculation load are increased. Further, accuracy of estimation of the estimation lane marking information using the lane marking information is lowered as a time period between the time point when the lane marking information is detected and the current time point is longer. Accordingly, in the first embodiment, the travel path recognizer 23 stores a maximum of ten pieces of lane marking information. According to such a configuration, for example, provided that lane marking information is stably obtained, lane marking information from the current time to a time point approximately 1 sec earlier than the current time is stored in the travel path recognizer 23.

Operation

Figure 3:
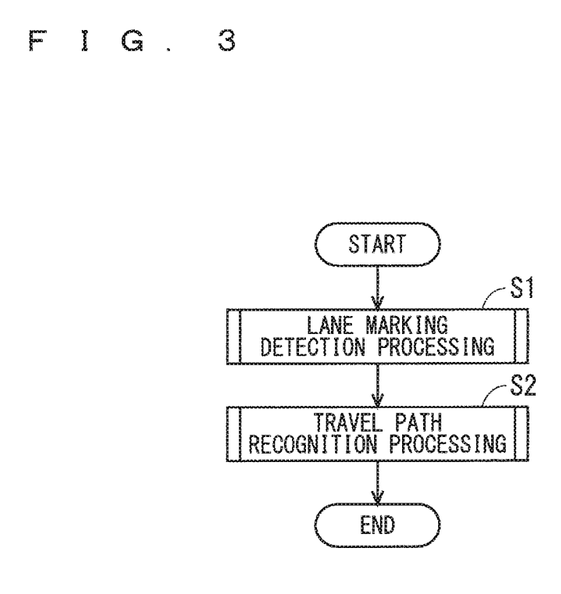
FIG. 3 is a flowchart illustrating operation of the travel path recognition apparatus according to the first embodiment.

FIG. 3 is a flowchart illustrating operation of the travel path recognition apparatus according to the first embodiment. The operation of FIG. 3 is performed on a certain cycle, for example, on a 0.01-second cycle.

First, in Step S1, the lane marking detector 22 performs lane marking detection processing to detect lane marking information. The lane marking detector 22 detects lane marking information including the above-mentioned vehicle-lane marking distance, vehicle angle, curvature, and curvature change rate by using the above-mentioned detection method or the like. Note that, although not illustrated, vehicle behavior is also detected depending on the detection of the lane marking information.

In Step S2, the travel path recognizer 23 performs travel path recognition processing to estimate estimation lane marking information depending on a condition. As will be apparent in the later description, the travel path recognizer 23 according to the first embodiment corrects a plurality of pieces of lane marking information into a plurality of pieces of current-position lane marking information concerning a position and a shape of the lane marking with respect to the current position of the vehicle 1 based on the vehicle behavior. Then, the travel path recognizer 23 estimates one piece of current-position lane marking information as the estimation lane marking information based on the plurality of pieces of current-position lane marking information.

According to such a configuration, the lane marking information corrected based on the vehicle behavior is used to estimate the estimation lane marking information. Therefore, accuracy of estimation of the estimation lane marking information can be enhanced. Further, a plurality of pieces of previously detected lane marking information are used to estimate the estimation lane marking information. Therefore, influence of unevenness of the lane marking information due to a detection error and disturbance over the estimation of the estimation lane marking information can be reduced.

The travel path recognizer 23 recognizes a travel path on which the vehicle 1 travels based on the estimation lane marking information. In the first embodiment, the control unit 10 (FIG. 2) implementing the travel path recognition apparatus controls an electric current of the motor 3 based on the travel path recognized by the travel path recognizer 23 to perform known steering angle control. This can optimize a lane keep assist function, which maintains traveling of the vehicle 1 along a portion, such as a center portion between traffic lanes, for example.

Figure 4:
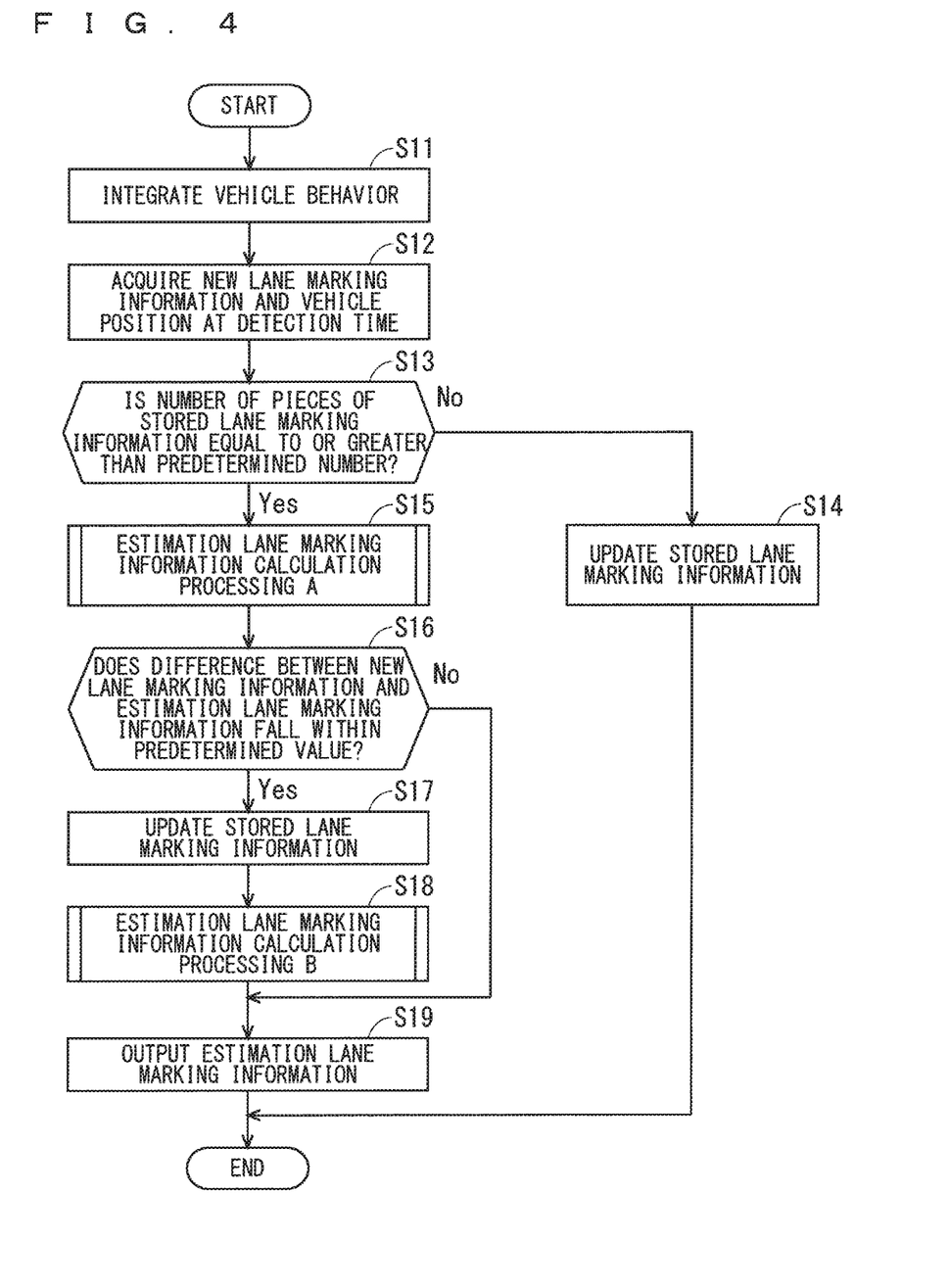
FIG. 4 is a flowchart illustrating operation of the travel path recognition apparatus according to the first embodiment.

FIG. 4 is a flowchart illustrating the detail of the travel path recognition processing in Step S2 of FIG. 3.

First, in Step S11, the travel path recognizer 23 performs vehicle behavior integration that integrates vehicle behavior corresponding to each piece of the detected lane marking information. The travel path recognizer 23 integrates the vehicle behavior from the time of detecting each lane marking to the current time for every cycle to acquire a position and a traveling direction of the vehicle 1 that has changed from the detection time to the current time. These pieces of information are used to convert a coordinate system of intermediate lane marking information in estimation lane marking information calculation processing to be described later, for example.

In Step S12, the travel path recognizer 23 acquires new lane marking information, which is the latest lane marking information detected by the lane marking detector 22, and the position of the vehicle 1 at the time of detecting the new lane marking information, from the lane marking detector 22.

Note that, regarding the position of the vehicle 1 at the detection time, influence caused by a time difference between a first time point and a second time point may not be tolerated in some cases. The first time point is a time point when the lane marking detector 22 detects the lane marking. The second time point is a time point when the travel path recognizer 23 acquires the lane marking information. Examples of the cause of such a time difference include a period of time required for the calculation when the front-view image captured by the camera 8 is processed to obtain the lane marking information, a communication delay caused by communication through a communication line such as a controller area network (CAN), etc. For example, when the degree of the time different is such a degree that may be tolerated (e.g., approximately 0.01 sec), the above-mentioned first time point and the above-mentioned second time point may be regarded as an identical time point, and thus a deviation of both of a traveling distance and a vehicle rotation angle caused by the time difference may be 0. On the other hand, for example, when the degree of the time difference is such a degree that may not be tolerated (e.g., approximately 0.1 sec), the vehicle 1 travels several meters during the time period. In such a case, the travel path recognizer 23 may use the acquired position of the vehicle 1 as a position of the vehicle 1 detected 0.1 sec earlier than the acquisition time point. The position of the vehicle 1 earlier than 0.1 sec can be obtained by integrating the vehicle behavior during the 0.1 sec, similarly to Step S11 described above.

In Step S13, the travel path recognizer 23 determines whether the number of the pieces of lane marking information that the travel path recognizer 23 stores is equal to or greater than a predetermined number. In estimation lane marking information calculation processing A of Step S15 to be described later, the travel path recognizer 23 estimates estimation lane marking information based on the plurality of pieces of stored lane marking information. Therefore, a certain number of pieces of lane marking information are required to obtain a stable estimation value as the estimation lane marking information. However, if the estimation lane marking information is not estimated until there are an excessive large number of pieces of lane marking information, later control using the estimation lane marking information cannot be appropriately performed. In addition, a storage area and a period of time required for processing are increased. Accordingly, the first embodiment uses the number "five" as the predetermined number, for example.

Note that the travel path recognizer 23 may determine effectiveness of the lane marking information when the travel path recognizer 23 determines the number of the pieces of stored lane marking information, and may discard the lane marking information, i.e., erase the lane marking information from memory, depending on a result of the determination. For example, regarding the lane marking located away from the vehicle 1 by a maximum distance (e.g., 100 m), in which the lane marking in front of the vehicle 1 can be detected depending on capacity of the camera 8 or the like, it can be said that the lane marking information of the lane marking is not appropriate. Therefore, when a vehicle traveling distance from the detection time of the lane marking information to this Step S13 exceeds the above-mentioned maximum distance, it can be said that accuracy of the lane marking information is lowered. Accordingly, the travel path recognizer 23 may use a detectable area, which is an area in which the camera 8 can appropriately detect, as a threshold value. When the vehicle traveling distance from the detection time of the lane marking information to this Step S13 exceeds the threshold value, the travel path recognizer 23 may erase the lane marking information from the memory. In this case, the travel path recognizer 23 determines the number of pieces of lane marking information also including effectiveness of the lane marking information. Therefore, use of lane marking information having low accuracy in the later processing can be reduced.

Further, even when the vehicle traveling distance from the detection time of the lane marking information to this Step S13 does not exceed the detectable area of the camera 8, the detectable area of the camera 8 is considered to be narrower than a usual detectable area in some cases. Such cases include, for example, a case where visibility is poor due to a sharp curve etc., a case where a capturing area of a lane marking is narrowed because of large inclination between the vehicle 1 and the lane marking, a case where an inter-vehicle distance between the vehicle 1 and a preceding vehicle of the vehicle 1 is small, or the like. Accordingly, the travel path recognizer 23 may reduce the detectable area used as a threshold value in the determination of effectiveness of the lane marking information as appropriate depending on detection of each state. As the detection of a state, inclination and curvature of the vehicle 1 may be detected from the lane marking information. Further, as the detection of a state, an inter-vehicle distance between the vehicle and the preceding vehicle may be separately detected by the camera 8, or may be measured by a known radar or the like.

If it is determined that the number of the pieces of stored lane marking information is equal to or greater than the predetermined number in Step S13, the processing proceeds to Step S15. If it is determined that the number of the pieces of stored lane marking information is less than the predetermined number, the processing proceeds to Step S14.

If the processing proceeds from Step S13 to Step S14, the travel path recognizer 23 stores the new lane marking information acquired in Step S12 as it is, and updates stored lane marking information that is the lane marking information stored by the travel path recognizer 23. At this time point, the number of pieces of stored lane marking information is small. Thus, the travel path recognizer 23 does not output estimation lane marking information (Step S19), and the processing of FIG. 4 ends.

On the other hand, if the processing proceeds from Step S13 to Step S15, i.e., if the stored lane marking information includes a predetermined number of pieces of lane marking information or more, the travel path recognizer 23 performs estimation lane marking information calculation processing A based on the stored lane marking information, and estimates estimation lane marking information to be used in the following Step S16. The detail of the estimation lane marking information calculation processing A will be described later.

In Step S16, the travel path recognizer 23 compares the new lane marking information acquired in Step S12 and the estimation lane marking information calculated in Step S15, and determines whether a difference between the new lane marking information and the estimation lane marking information falls within a predetermined value. The predetermined value is appropriately set to exclude an abnormal value, such as abnormal lane marking information. For example, as the predetermined value, a value obtained by adding a change width of a road structure (a lane marking) between calculation cycles, a value in consideration of a change amount generated by vehicle behavior, and a margin such as a detection error etc. to each of the vehicle-lane marking distance, the vehicle angle, and the curvature is set. In the first embodiment, as the predetermined values of the vehicle-lane marking distance, the vehicle angle, and the curvature, 0.5 [m], 0.1 [rad], and 0.002 [1/m] are used, respectively.

If it is determined that the above-mentioned difference exceeds the predetermined value in any of the vehicle-lane marking distance, the vehicle angle, and the curvature in Step S16, the processing proceeds to Step S19. On the other hand, if it is determined that the above-mentioned difference falls within the predetermined value in all of the vehicle-lane marking distance, the vehicle angle, and the curvature, the processing proceeds to Step S17.

If the processing proceeds from Step S16 to Step S17, the travel path recognizer 23 determines that the new lane marking information acquired in Step S12 is normal, stores the lane marking information as it is, and updates the stored lane marking information. If the number of pieces of the stored lane marking information exceeds a maximum storage number (here, 10) at the time of the update, the oldest piece of lane marking information is erased from the stored lane marking information, and includes the new lane marking information acquired in Step S12 in the stored lane marking information.

In Step S18, the travel path recognizer 23 performs estimation lane marking information calculation processing B based on the stored lane marking information updated in Step S17. The estimation lane marking information calculation processing B and the estimation lane marking information calculation processing A in Step S15 are the same, except that a processing target is different. Specifically, a processing target of the estimation lane marking information calculation processing A in Step S15 is the stored lane marking information not including the new lane marking information acquired in Step S12, whereas a processing target of the estimation lane marking information calculation processing B is the stored lane marking information including the new lane marking information acquired in Step S12.

If the processing proceeds from Step S18 to Step S19, the travel path recognizer 23 outputs the estimation lane marking information calculated in Step S18, and the processing of FIG. 4 ends. If the processing proceeds from Step S16 to Step S19, the travel path recognizer 23 determines that the new lane marking information acquired in Step S12 is abnormal. Then, the travel path recognizer 23 outputs the estimation lane marking information calculated in Step S15 without including the lane marking information that is abnormal in the stored lane marking information, and the processing of FIG. 4 ends.

Figure 5:
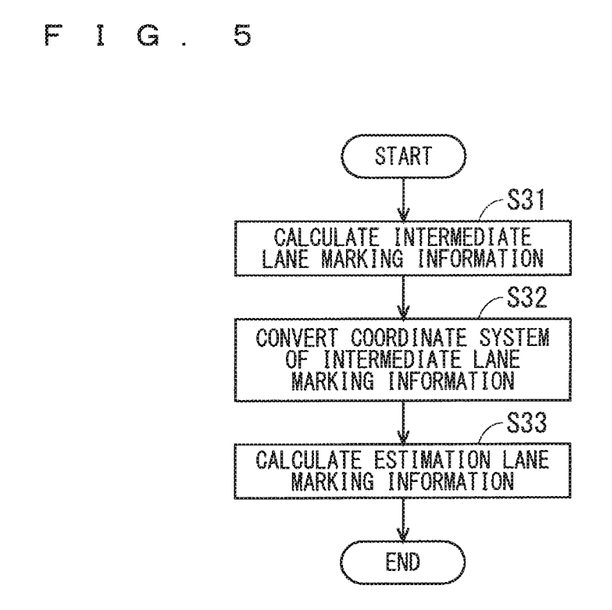
FIG. 5 is a flowchart illustrating operation of the travel path recognition apparatus according to the first embodiment.
Figure 6:
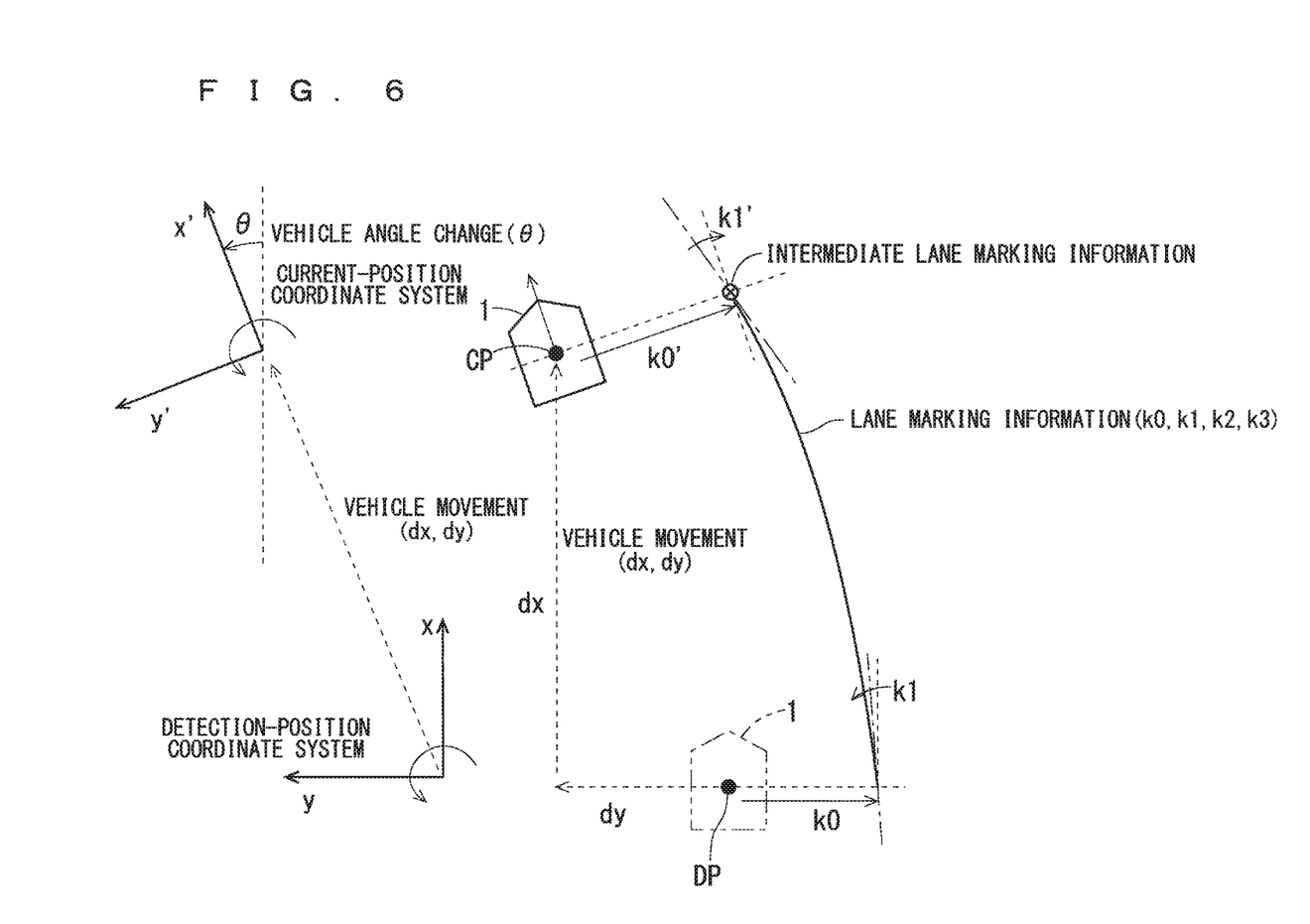
FIG. 6 is a diagram illustrating one example of estimation lane marking information calculation processing of the travel path recognition apparatus according to the first embodiment.

FIG. 5 is a flowchart illustrating the detail of the estimation lane marking information calculation processing performed in each of Steps S15 and S18. FIG. 6 is a diagram illustrating one example of the estimation lane marking information calculation processing.

Note that Steps S31 and S32 are performed on each piece of the lane marking information equal to or greater than the predetermined number of pieces included in the stored lane marking information. However, the detail of the processing is the same, and therefore one piece of lane marking information is described as an example.

First, in Step S31, the travel path recognizer 23 reads out lane marking information from the stored lane marking information, and calculates intermediate lane marking information based on a vehicle-lane marking distance k0, a vehicle angle k1, curvature k2, and a curvature change rate k3 included in the lane marking information.

Note that the intermediate lane marking information is information in the middle of conversion from lane marking information to current-position lane marking information. Here, the intermediate lane marking information is information concerning a position and a shape of a lane marking in a detection-position coordinate system of a case where the vehicle 1 travels from a detection position DP (FIG. 6) that is a position of the vehicle 1 when the lane marking information is detected to the current position CP (FIG. 6).

The detection-position coordinate system is a coordinate system with respect to the detection position DP. In the example of FIG. 6, as the detection-position coordinate system, an orthogonal coordinate system in which a front-and-back direction and a right-and-left direction of the vehicle 1 at the detection position DP are respectively represented by an x direction and a y direction is used. Since the intermediate lane marking information is information concerning the position and the shape of the lane marking as described above, the intermediate lane marking information includes a vehicle-lane marking distance, a vehicle angle, curvature, and a curvature change rate, similarly to the lane marking information.

Next, operation that the travel path recognizer 23 calculates the intermediate lane marking information will be described.

A vehicle-lane marking distance k0(L), a vehicle angle k1(L), and curvature k2(L) of the lane marking in the detection-position coordinate system when the vehicle 1 travels a distance L [m] from the detection position DP may be calculated by using the following formula (1) including k0 to k2 of the lane marking information. Note that a curvature change rate k3(L) is constant as described above, and is equal to k3.

[Formula 1]

$$k0(L) = k0 + k1 \times L + \frac{1}{2} \times k2 \times L^2 + \frac{1}{6} \times k3 \times L^3 \\ k1(L) = k1 + k2 \times L + \frac{1}{2} \times k3 \times L^2 \\ k2(L) = k2 + k3 \times L$$ (1)

The travel path recognizer 23 calculates a distance from the detection position DP to the current position CP based on an integration value of the vehicle behavior acquired and updated in Steps S11 and S12. Then, the travel path recognizer 23 substitutes the distance for L of the formula (1) above to calculate a vehicle-lane marking distance, a vehicle angle, and curvature of the intermediate lane marking information.

In a strict sense, a deviation corresponding to an inclination amount of the vehicle 1 at the current position CP is generated. However, it is assumed that the vehicle 1 travels at a relatively high speed during operation of the lane keep assist, and thus a deviation of the inclination of the vehicle 1 is hardly generated in actuality. Therefore, in order to calculate the intermediate lane marking information, it is sufficient that a vertical movement amount (dx in FIG. 6), which is a movement amount in the x direction from the detection position DP to the current position CP, be substituted for L. In contrast, when the above-mentioned deviation may not be tolerated due to low-speed traveling and a relatively large steering angle, such as in a case of following a preceding vehicle during traffic congestion, the calculation may be performed in consideration of an inclination amount of the vehicle at the current position CP.

Next, calculation of the vertical movement amount dx based on the integration value of the vehicle behavior will be described. Note that, in addition to the above-mentioned vertical movement amount dx, examples of the values that can be calculated based on an integration value of the vehicle behavior include a horizontal movement amount dy, which is a movement amount in the y direction from the detection position DP to the current position CP, and a vehicle angle change θ, which is an angle formed between the x direction of the detection position DP and the x direction of the current position CP. Such values can be calculated as below.

First, the vehicle angle change θ can be calculated by integrating the yaw rate from the detection time to the current time. The vertical movement amount dx and the horizontal movement amount dy can be calculated by integrating the vehicle speed from the detection time to the current time, and then separating a traveling distance (Svsp) obtained by the integration into an x-direction component and a y-direction component by using the vehicle angle change θ. In a strict sense, an error is generated due to erratic driving or the like also in the vehicle movement distance such as the vertical movement amount dx and the horizontal movement amount dy. However, similarly to the above, it is assumed that the vehicle 1 travels at a relatively high speed, and thus it can be said that the error and influence of the error are trivial. Note that, if θ is small, a calculation load may be reduced as in the following formula (2) by carrying out approximation as $\sin(\theta) \approx \theta$ and $\cos(\theta) \approx 1 - \theta^2/2$.

[Formula 2]

$$dx = Svsp \times \cos(\theta) \approx Svsp \times \left(1 - \frac{\theta^2}{2}\right) \\ dy = Svsp \times \sin(\theta) \approx Svsp \times \theta$$ (2)

In view of the above, the travel path recognizer 23 is configured to calculate the vertical movement amount dx based on the integration value of the vehicle behavior acquired and updated in Steps S11 and S12 and substitute the vertical movement amount dx for L of the formula (1) above to calculate the intermediate lane marking information. A plurality of pieces of intermediate lane marking information can be obtained by carrying out this calculation for each of a plurality of pieces of lane marking information. However, the coordinate system of the intermediate lane marking information is a detection-position coordinate system, and the detection-position coordinate system is different depending on a detection position of each piece of lane marking information. Therefore, processing, such as calculation of an average, should not be performed on the plurality of pieces of intermediate lane marking information as they are. Specifically, when processing such as calculation of an average is performed on the plurality of pieces of intermediate lane marking information, the coordinate systems of the pieces of lane marking information as processing targets should be the same.

Accordingly, in Step S32 of FIG. 5, the travel path recognizer 23 converts the coordinate system of each of the plurality of pieces of intermediate lane marking information obtained in Step S31 from the detection-position coordinate system with respect to the detection position DP (FIG. 6) to a current-position coordinate system with respect to the current position CP (FIG. 6) to correct the plurality of pieces of intermediate lane marking information into a plurality of pieces of current-position lane marking information. This enables use of values corresponding to the current position of the vehicle 1 in control and collective processing of the values corresponding to the current position of the vehicle 1, for example, irrespective of the detection position of each piece of lane marking information.

Note that the current-position lane marking information is information concerning the position and the shape of the lane marking with respect to the current-position coordinate system. In the example of FIG. 6, as the current-position coordinate system, an orthogonal coordinate system in which a front-and-back direction and a right-and-left direction of the vehicle 1 at the current position CP are respectively represented by an x' direction and a y' direction is used. Since the current-position lane marking information is information concerning the position and the shape of the lane marking as described above, the current-position lane marking information includes a vehicle-lane marking distance, a vehicle angle, curvature, and a curvature change rate, similarly to the lane marking information.

Next, operation that the travel path recognizer 23 calculates the current-position lane marking information will be described.

First, regarding the vehicle-lane marking distance of the current-position lane marking information, it is sufficient that k0(dx) be converted from the detection-position coordinate system to the current-position coordinate system by using a known method of converting coordinates. For example, with respect to k0(dx), an amount corresponding to a movement distance (dx, dy) from the detection position DP to the current position CP is deviated, and then an amount corresponding to a vehicle angle change (θ) is rotated. Consequently, a vehicle-lane marking distance k0' of the current-position lane marking information can be obtained. Note that the position of the vehicle 1 in the x direction in the detection-position coordinate system of k0' is dx, and the position of the vehicle 1 in the x' direction in the current-position coordinate system is 0. From the description above, the vehicle-lane marking distance k0' of the current-position lane marking information is expressed as in the following formula (3). Accordingly, the travel path recognizer 23 applies k0(dx) of the intermediate lane marking information and dy and θ calculated based on the vehicle behavior to the following formula (3) to calculate a vehicle-lane marking distance k0' of the current-position lane marking information.

[Formula 3]

$$k0'=(k0(dx)-dy)\times\cos(\theta) \quad (3)$$

The vehicle angle of the current-position lane marking information is angle between the vehicle inclination and the inclination of the lane marking at the detection time in the detection-position coordinate system, and thus needs to be converted to the current vehicle inclination. A change amount of the vehicle inclination from the detection time to the current time is θ, and therefore the vehicle angle of the current-position lane marking information is expressed as in the following formula (4). Accordingly, the travel path recognizer 23 applies k1(dx) of the intermediate lane marking information and θ calculated based on the vehicle behavior to the following formula (4) to calculate a vehicle angle k1' of the current-position lane marking information.

[Formula 4]

$$k1'=k1(dx)-\theta \quad (4)$$

The curvature of the lane marking of the current-position lane marking information is not influenced by inclination of the vehicle 1, and therefore the curvature of the lane marking of the intermediate lane marking information can be used as it is. The curvature of the current-position lane marking information is expressed as in the following formula (5). Accordingly, the travel path recognizer 23 applies k2(dx) of the intermediate lane marking information to the following formula (5) to calculate curvature k2' of the current-position lane marking information.

[Formula 5]

$$k2'=k2(dx) \quad (5)$$

Through Step S32 described in the above, the travel path recognizer 23 acquires a plurality of pieces of current-position lane marking information.

In Step S33 of FIG. 5, the travel path recognizer 23 estimates one piece of current-position lane marking information as the estimation lane marking information based on the plurality of pieces of current-position lane marking information. Here, values of the plurality of pieces of current-position lane marking information are values of the current-position coordinate system converted in Step S32. Therefore, provided that the detection and the conversion are performed without an error, the values are supposed to be the same. In the first embodiment, the travel path recognizer 23 estimates one piece of current-position lane marking information as the estimation lane marking information by calculating an average of the plurality of pieces of current-position lane marking information. Consequently, stable estimation values and stable estimation lane marking information can be estimated.

Note that estimation of the estimation lane marking information is not limited to the above. For example, effectiveness of the lane marking described in Step S13 above may be taken into consideration. Further, for example, a weighted average with a weight depending on a traveling distance from the detection time may be calculated. Specifically, a longer traveling distance from the detection time is regarded as old information, and thus a small weight is used. A shorter traveling distance from the detection time is regarded as recent information, and thus a large weight is used. This enhances a contribution rate of highly effective information, and therefore further accuracy enhancement can be expected.

Gist of First Embodiment

According to the travel path recognition apparatus of the first embodiment as described above, the travel path recognizer 23 uses the lane marking information corrected based on the vehicle behavior to estimate the estimation lane marking information. Therefore, accuracy of the estimation can be further enhanced than the accuracy of the estimation of a case where a simple extrapolation method is used. Further, the travel path recognizer 23 uses a plurality of pieces of previously detected lane marking information to estimate the estimation lane marking information. Therefore, influence of unevenness of the lane marking information due to a detection error and disturbance over the estimation of the estimation lane marking information can be reduced.

Further, in the first embodiment, only when a difference between one piece of new lane marking information newly detected by the lane marking detector 22 and the estimation lane marking information falls within a predetermined threshold value, the travel path recognizer 23 includes the new lane marking information in the stored lane marking information (Steps S16 and S17 of FIG. 4). The stored lane marking information herein may be referred to as a plurality of pieces of lane marking information to be used in the estimation. According to such a configuration, influence of unevenness of the lane marking information due to a detection error and disturbance over the estimation of the estimation lane marking information can further be reduced.

Second Embodiment

The travel path recognition apparatus according to the first embodiment is configured such that whether or not one piece of new lane marking information newly detected by the lane marking detector 22 is abnormal is determined, and the one piece of new lane marking information is included in the stored lane marking information if the one piece of new lane marking information is normal, and the one piece of new lane marking information is not included in the stored lane marking information if the one piece of new lane marking information is not normal. However, the configuration is not limited to the above. Whether or not the stored lane marking information is abnormal may further be determined by determining unevenness of the stored lane marking information itself as in a travel path recognition apparatus according to a second embodiment of the present invention described below.

Figure 7:
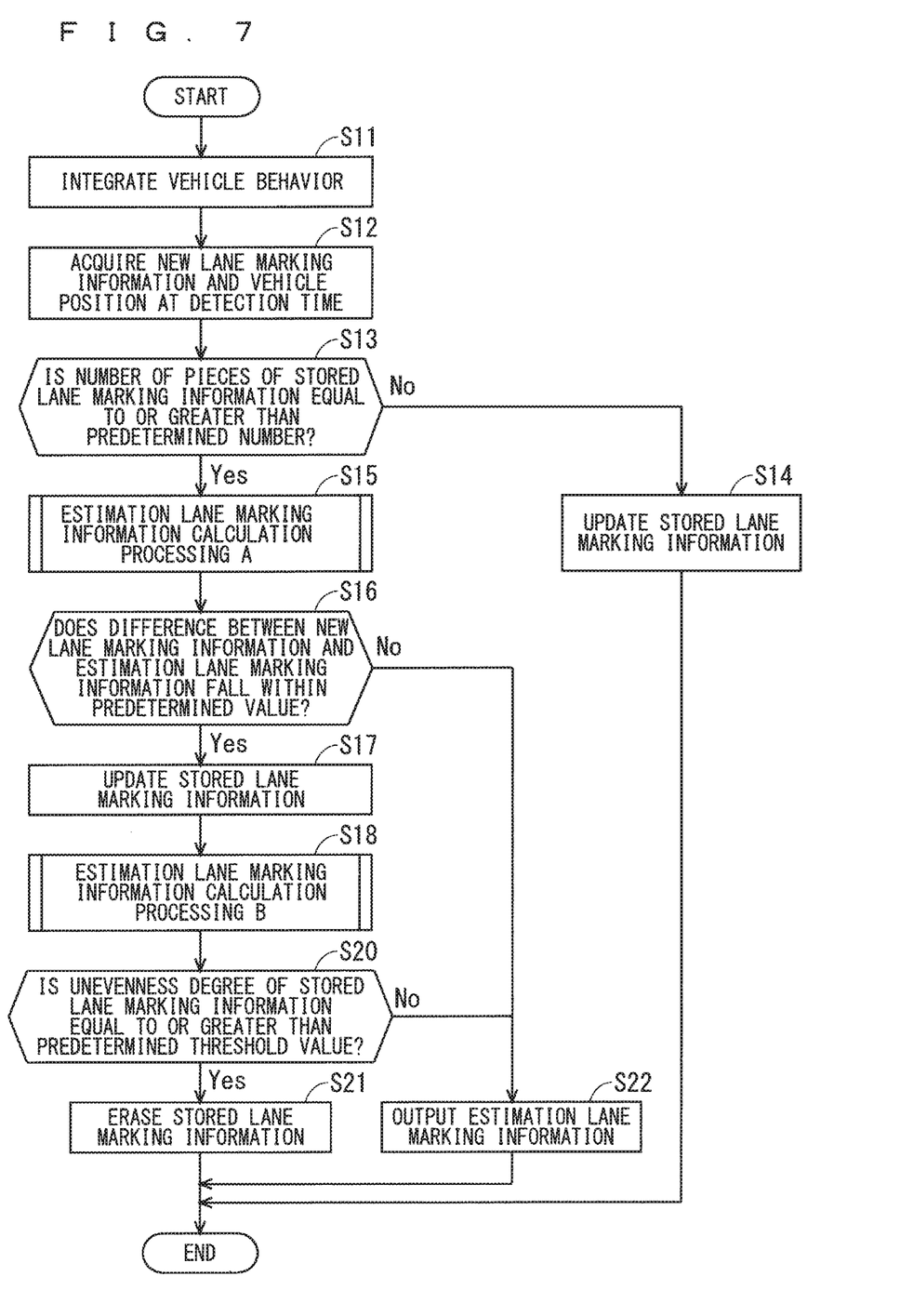
FIG. 7 is a flowchart illustrating operation of a travel path recognition apparatus according to a second embodiment.

FIG. 7 is a flowchart illustrating the detail of travel path recognition processing according to the second embodiment. The travel path recognition apparatus according to the second embodiment performs the same operation as the operation of the travel path recognition apparatus according to the first embodiment, except that Step S19 is replaced by Steps S20 to 22 and processing proceeds to Step S22 if it is determined in Step S16 that the difference does not fall within the predetermined value in the travel path recognition processing (FIG. 4) according to the first embodiment. Accordingly, Steps S20 to 22 will be mainly described below.

In Step S20 after Step S18, the travel path recognizer 23 calculates an unevenness degree of the plurality of pieces of current-position lane marking information included in the stored lane marking information calculated in Steps S31 and S32 (FIG. 5) in the estimation lane marking information calculation processing B of Step S18. Specifically, the travel path recognizer 23 calculates an unevenness degree of each of the vehicle-lane marking distance, the vehicle angle, and the curvature of the lane marking included in each of the plurality of pieces of current-position lane marking information. Here, description is given assuming that the unevenness degree is variance, but this is not restrictive. For example, the unevenness degree may be standard deviation or the like. Note that standard deviation requires calculation of a square root, and therefore it is preferable to use variance that does not require calculation of a square root as the unevenness degree when reduction in calculation processing is required, for example.

The travel path recognizer 23 determines whether or not the calculated unevenness degree is equal to or greater than a predetermined threshold value. Processing proceeds to Step S21 if the variance is equal to or greater than the threshold value, and processing proceeds to Step S22 if the variance is less than the threshold value. Here, if the processing proceeds to Step S21, the stored lane marking information is erased as will be described below, and therefore it takes time from estimating estimation lane marking information to outputting the estimation lane marking information in the next time. Therefore, the threshold value used in the determination of Step S20 may be set to such a value that the processing does not proceed to Step S21 in a case of a normal condition but does proceed to Step S21 in a case of an abnormal condition where error detection frequently occurs due to deterioration of a detection condition. For example, as the threshold values of the vehicle-lane marking distance, the vehicle angle, and the curvature of the lane marking, values such as 0.16, $6.4 \times 10^{-3}$, $1.0 \times 10^{-6}$ are used, respectively.

If the processing proceeds from Step S20 to Step S21, the travel path recognizer 23 erases the stored lane marking information, and the processing of FIG. 7 ends.

On the other hand, if the processing proceeds from Step S20 to Step S22, the travel path recognizer 23 determines that the stored lane marking information is normal. Then, the travel path recognizer 23 outputs the estimation lane marking information calculated in Step S18, and the processing of FIG. 7 ends.

Gist of Second Embodiment

According to the travel path recognition apparatus of the second embodiment as described above, the travel path recognizer 23 calculates an unevenness degree of a plurality of pieces of current-position lane marking information. When the unevenness degree is equal to or greater than a predetermined threshold value, the travel path recognizer 23 erases the stored lane marking information. The stored lane marking information herein may be referred to as a plurality of pieces of lane marking information to be used in the estimation. According to such a configuration, influence of unevenness of the lane marking information due to a detection error and disturbance over the estimation of the estimation lane marking information can further be reduced.

Modification

The description above describes a device using results of recognition of a travel path in the lane keep assist, but this is not restrictive. The results of recognition of a travel path may be used in a traffic-lane deviation alarm device, an automated driving device, or the like. The technology described in the embodiments may be applied in each of the devices when lane marking information and a travel path are used.

Other Modification

Figure 8:
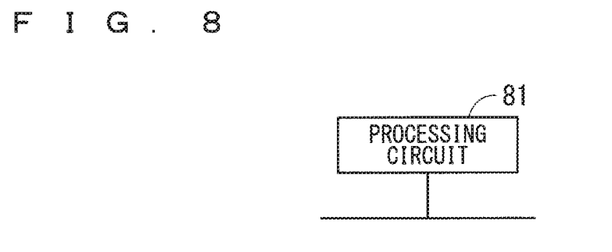
FIG. 8 is a block diagram illustrating one example of a hardware configuration of the travel path recognition apparatus.

The lane marking acquisition unit, the vehicle behavior acquisition unit, and the travel path recognizer of the travel path recognition apparatus are hereinafter referred to as "lane marking acquisition unit etc." The lane marking acquisition unit etc. are implemented by a processing circuit 81 of FIG. 8 corresponding to the control unit 10 of FIG. 1. Specifically, the processing circuit 81 includes a lane marking acquisition unit that acquires lane marking information, a vehicle behavior acquisition unit that acquires vehicle behavior concerning a vehicle speed and a yaw rate of the vehicle 1 from acquisition time of the lane marking information to current time, and a travel path recognizer that recognizes a travel path on which the vehicle 1 travels based on the lane marking information. The processing circuit 81 may use dedicated hardware, or may use a processor to execute a program stored in memory. Examples of the processor include a central processing unit, a processing unit, an arithmetic unit, a microprocessor, a microcomputer, a digital signal processor (DSP), etc.

If the processing circuit 81 is dedicated hardware, examples of the processing circuit 81 include a single circuit, a composite circuit, a programmed processor, a processor for parallel programming, an application specific integrated circuit (ASIC), a field programmable gate array (FPGA), or a combination of these. The function of each part of the lane marking acquisition unit etc. may be implemented by a circuit in which processing circuits are distributed, or the function of each part may be collectively implemented by one processing circuit.

Figure 9:
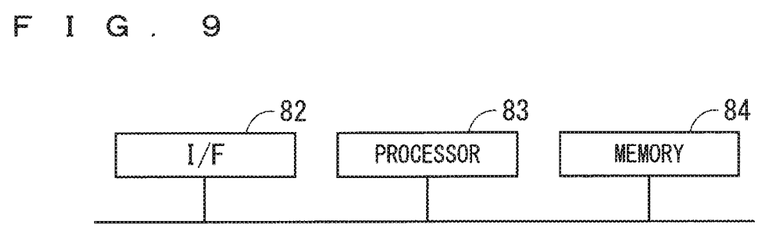
FIG. 9 is a block diagram illustrating one example of a hardware configuration of the travel path recognition apparatus.

If the processing circuit 81 is a processor, the functions of the lane marking acquisition unit etc. are implemented by a combination with software etc. Note that examples of the software etc. include software, firmware, or software and firmware. Software etc. are described as a program, and are stored in memory. As illustrated in FIG. 9, a processor 83 used in the processing circuit 81 reads out and executes a program stored in memory 84 to implement a function of each part that processes a signal input and output between the processor 83 and an external device, such as the wheel speed sensor 6, the yaw rate sensor 7, the camera 8, and the motor 3 of FIG. 1, via an input-output control interface (I/F) 82. Specifically, the travel path recognition apparatus includes the memory 84 for storing the program that eventually executes a step of acquiring lane marking information, a step of acquiring vehicle behavior concerning a vehicle speed and a yaw rate of the vehicle 1 from acquisition time of the lane marking information to current time, and a step of recognizing a travel path on which the vehicle 1 travels based on the lane marking information, when the program is executed by the processing circuit 81. In other words, it can be said that the program makes a computer execute a procedure and a method of the lane marking acquisition unit etc. Here, examples of the memory 84 may include a non-volatile or volatile semiconductor memory, such as random access memory (RAM), read only memory (ROM), flash memory, erasable programmable read only memory (EPROM), and electrically erasable programmable read only memory (EEPROM), a hard disk drive (HDD), a magnetic disk, a flexible disk, an optical disc, a compact disc, a MiniDisc, a digital versatile disc (DVD), a drive device therefor, and any storage medium that may be used ahead.

In the above, a configuration in which each function of the lane marking acquisition unit etc. is implemented by any one of hardware and software etc. is described. However, the configuration is not limited to the above, and a configuration in which a part of the lane marking acquisition unit etc. is implemented by dedicated hardware and another part is implemented by software etc. may be adopted. For example, the function of the lane marking acquisition unit and the vehicle behavior acquisition unit may be implemented by a processing circuit as dedicated hardware, such as a receiver. The function of other parts may be implemented by the processing circuit 81 as the processor 83 reading out and executing the program stored in the memory 84.

In this manner, the processing circuit 81 may implement the above-mentioned each function by hardware, software etc., or a combination of these.

Further, the travel path recognition apparatus described above may also be used in a travel path recognition system constructed as a system achieved by appropriately combining a navigation device such as a portable navigation device (PND), a communication terminal including a portable terminal such as a mobile phone, a smartphone, and a tablet, a function of an application installed in these devices, and a server. In this case, each function or each component of the travel path recognition apparatus described above may be distributed in each device that constructs the above-mentioned system, or may be centralized in any of the devices.

Note that, in the present invention, each of the embodiments and each of the modifications may be freely combined, and each of the embodiments and each of the modifications may be modified or omitted as appropriate within the scope of the present invention.

While the invention has been shown and described in detail, the foregoing description is in all aspects illustrative and not restrictive. It is therefore understood that numerous unillustrated modifications can be devised without departing from the scope of the invention.

EXPLANATION OF REFERENCE SIGNS

1 vehicle, 21 vehicle behavior detector, 22 lane marking detector, 23 travel path recognizer

The invention claimed is:
1. A travel path recognition apparatus comprising:
a memory; and
a processor configured to:
  acquire lane marking information concerning a position and a shape of a lane marking in front of a vehicle with respect to a position of the vehicle;
  acquire vehicle behavior concerning a vehicle speed and a yaw rate of the vehicle from acquisition time of the lane marking information to current time; and
  recognize a travel path on which the vehicle travels based on the lane marking information; and
  control at least one of a motor coupled to a steering device and a traffic-lane deviation alarm device based on the recognized travel path on which the vehicle travels, wherein
when the processor acquires a plurality of pieces of the lane marking information equal to or greater than a predetermined number, corrects the plurality of pieces of the lane marking information into a plurality of pieces of current-position lane marking information based on the vehicle behavior, and estimates one piece of current-position lane marking information as estimation lane marking information based on the plurality of pieces of current-position lane marking information to use the estimation lane marking information to recognize the travel path, the plurality of pieces of current-position lane marking information concerning the position and the shape of the lane marking with respect to a current position of the vehicle, and
only when a difference between one piece of the lane marking information newly acquired by the processor and the estimation lane marking information is smaller than a predetermined threshold value, the processor includes the one piece of the newly acquired lane marking information in the plurality of pieces of the lane marking information to be used in estimation.

2. The travel path recognition apparatus according to claim 1, wherein
the processor calculates an unevenness degree of the plurality of pieces of current-position lane marking information, and erases the plurality of pieces of the lane marking information to be used in estimation when the unevenness degree is equal to or greater than a predetermined threshold value.

3. The travel path recognition apparatus according to claim 2, wherein
each of the plurality of pieces of current-position lane marking information includes a distance between the vehicle and a portion of the lane marking on a side of the vehicle, a vehicle angle being inclination of a traveling direction of the vehicle with respect to the portion of the lane marking, and curvature of the lane marking, and
the unevenness degree includes standard deviation or variance of each of the distance, the vehicle angle, and the curvature.

4. The travel path recognition apparatus according to claim 1, wherein
when a number of the acquired plurality of pieces of the lane marking information is equal to or greater than a first number as the predetermined number and equal to or smaller than a second number greater than the predetermined number, the processor corrects the plurality of pieces of current-position lane marking information, estimates the estimation lane marking information, and uses the estimation lane marking information to recognize the travel path.

5. A travel path recognition method comprising:
acquiring lane marking information concerning a position and a shape of a lane marking in front of a vehicle with respect to a position of the vehicle;
acquiring vehicle behavior concerning a vehicle speed and a yaw rate of the vehicle from acquisition time of the lane marking information to current time; and
recognizing a travel path on which the vehicle travels based on the lane marking information; and
controlling at least one of a motor coupled to a steering device and a traffic-lane deviation alarm device based on the recognized travel path on which the vehicle travels, wherein
when a plurality of pieces of the lane marking information equal to or greater than a predetermined number are acquired, the recognizing of the travel path includes correcting the plurality of pieces of the lane marking information into a plurality of pieces of current-position lane marking information based on the vehicle behavior, and estimating one piece of current-position lane marking information as estimation lane marking information based on the plurality of pieces of current-position lane marking information to use the estimation lane marking information to recognize the travel path, the plurality of pieces of current-position lane marking information concerning the position and the shape of the lane marking with respect to a current position of the vehicle, and
only when a difference between one piece of the lane marking information newly acquired by the processor and the estimation lane marking information is smaller than a predetermined threshold value, the processor includes the one piece of the newly acquired lane marking information in the plurality of pieces of the lane marking information to be used in estimation.

* * * * *